United States Patent
Kim et al.

(10) Patent No.: US 12,378,396 B2
(45) Date of Patent: Aug. 5, 2025

(54) THERMOPLASTIC RESIN COMPOSITION AND MOLDED ARTICLE MANUFACTURED THEREFROM

(71) Applicant: LOTTE CHEMICAL CORPORATION, Seoul (KR)

(72) Inventors: Gi Sun Kim, Uiwang-si (KR); Dong Hui Chu, Uiwang-si (KR); Young Chul Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 228 days.

(21) Appl. No.: 18/037,160

(22) PCT Filed: Nov. 18, 2021

(86) PCT No.: PCT/KR2021/016972
§ 371 (c)(1),
(2) Date: May 16, 2023

(87) PCT Pub. No.: WO2022/145727
PCT Pub. Date: Jul. 7, 2022

(65) Prior Publication Data
US 2023/0407074 A1   Dec. 21, 2023

(30) Foreign Application Priority Data

Dec. 29, 2020   (KR) .................. 10-2020-0185727

(51) Int. Cl.
| | | |
|---|---|---|
| *C08L 25/12* | (2006.01) | |
| *C08K 3/22* | (2006.01) | |
| *C08K 3/40* | (2006.01) | |

(52) U.S. Cl.
CPC .............. *C08L 25/12* (2013.01); *C08K 3/22* (2013.01); *C08K 3/40* (2013.01); C08K 2003/2296 (2013.01); C08K 2201/014 (2013.01); C08L 2203/30 (2013.01); C08L 2205/025 (2013.01); C08L 2205/035 (2013.01)

(58) Field of Classification Search
CPC .... C08K 2003/0806; C08K 2003/2286; C08K 2003/2296; C08K 2201/014; C08K 3/08; C08K 3/10; C08K 3/16; C08K 3/22; C08K 3/32; C08K 3/40; C08L 2203/30; C08L 2205/025; C08L 2205/03; C08L 2205/035; C08L 25/12; C08L 51/04; C08L 55/02; C08L 77/12; C08L 25/08
See application file for complete search history.

(56) References Cited

U.S. PATENT DOCUMENTS

| | | |
|---|---|---|
| 4,356,300 A | 10/1982 | Isler et al. |
| 2007/0049678 A1 | 3/2007 | Kim et al. |
| 2020/0231799 A1 | 7/2020 | Lee et al. |

FOREIGN PATENT DOCUMENTS

| | | |
|---|---|---|
| JP | 55-133424 A | 10/1980 |
| JP | 56-045419 A | 4/1981 |
| JP | 10-120911 A | 5/1998 |
| JP | 2018-143962 A | 9/2018 |
| KR | 10-2015-0043608 A | 4/2015 |
| KR | 10-2020-0065139 A | 6/2020 |
| KR | 10-2020-0065241 A | 6/2020 |
| WO | 2019-031694 A1 | 2/2019 |
| WO | 2022/145727 A1 | 7/2022 |

OTHER PUBLICATIONS

International Search Report in counterpart International Application No. PCT/KR2021/016972 dated Feb. 25, 2022, pp. 1-8.

*Primary Examiner* — Lawrence D Ferguson
(74) *Attorney, Agent, or Firm* — Additon, Pendleton & Witherspoon, P.A.

(57) ABSTRACT

A thermoplastic resin composition of the present invention comprises: about 100 parts by weight of a rubber-modified aromatic vinyl-based copolymer resin containing a diene-based rubber-modified vinyl-based graft copolymer, an acrylic rubber-modified vinyl-based graft copolymer, a large-particle diameter rubber copolymer having an average particle diameter of about 5 to about 10 p m, and an aromatic vinyl-based copolymer resin; about 5 to about 25 parts by weight of a polyetheresteramide block copolymer; about 0.05 to about 1.5 parts by weight of a silver (Ag)-based compound; and about 1 to about 15 parts by weight of zinc oxide, wherein the gloss degree of a 3.2-mm thick sample is about 40 to about 70%, as measured at an angle of 600 according to ASTM D523. The thermoplastic resin composition is excellent in low gloss, antiviral properties, weather resistance, impact resistance, and so on.

11 Claims, No Drawings

THERMOPLASTIC RESIN COMPOSITION AND MOLDED ARTICLE MANUFACTURED THEREFROM

CROSS-REFERENCE TO RELATED APPLICATIONS

This application claims priority to and the benefit of International Application No. PCT/KR2021/016972, filed Nov. 18, 2021, which published as WO 2022/145727 on Jul. 7, 2022, and Korean Patent Application No. 10-2020-0185727, filed in the Korean Intellectual Property Office on Dec. 29, 2020, the entire disclosure of each of which is incorporated herein by reference.

TECHNICAL FIELD

The present invention relates to a thermoplastic resin composition and a molded article manufactured therefrom. More particularly, the present invention relates to a thermoplastic resin composition that exhibits good properties in terms of low gloss, antiviral properties, weather resistance, impact resistance, and the like, and a molded article manufactured therefrom.

BACKGROUND ART

Since the coronavirus pandemic, there has been increasing demand for thermoplastic resin products with antiviral properties. In particular, there are increasing cases where thermoplastic resins are used as low-glare exterior materials for indoor home appliances. Specifically, the thermoplastic resins are applied to refrigerator handles, exteriors of small appliances (air purifiers, humidifiers, and the like), and remote controllers.

In general, copper (Cu) compounds are recognized as materials capable of expressing antiviral performance. However, since application of copper compounds to thermoplastic resin compositions has problems, such as difficult processing, discoloration due to oxidation, and the like, applicable products are very limited. In addition, although a thermoplastic resin composition comprising an existing inorganic antibacterial agent has good antibacterial performance, it has not been confirmed whether the thermoplastic resin composition can express antiviral performance.

Therefore, there is a need for development of a thermoplastic resin composition having good properties in terms of low gloss, antiviral properties, weather resistance, impact resistance, and the like.

The background technique of the present invention is disclosed in Korean Patent Laid-open Publication No. 10-2020-0065139 and the like.

DISCLOSURE

Technical Problem

It is one aspect of the present invention to provide a thermoplastic resin composition having good properties in terms of low gloss, antiviral properties, weather resistance, impact resistance, and the like.

It is another aspect of the present invention to provide a molded article formed from the thermoplastic resin composition.

The above and other aspects of the present invention can be achieved by the present invention described below.

Technical Solution

1. One aspect of the present invention relates to a thermoplastic resin composition. The thermoplastic resin composition comprises: about 100 parts by weight of an rubber-modified aromatic vinyl copolymer resin comprising a diene-based rubber-modified vinyl graft copolymer, an acrylic rubber-modified vinyl graft copolymer, a large-diameter rubber copolymer having an average particle diameter of about 5 to about 10 μm, and an aromatic vinyl copolymer resin; about 5 to about 25 parts by weight of a polyether-ester-amide block copolymer; about 0.05 to about 1.5 parts by weight of a silver (Ag) compound; and about 1 to about 15 parts by weight of zinc oxide, and has a surface gloss of about 40 to about 70%, as measured on a 3.2 mm thick specimen at angle of 60° in accordance with ASTM D523.

2. In embodiment 1, the rubber-modified aromatic vinyl copolymer resin may comprise about 5 to about 15 wt % of the diene-based rubber-modified vinyl graft copolymer, about 5 to about 20 wt % of the acrylic rubber-modified vinyl graft copolymer, about 1 to about 5 wt % of the large-diameter rubber copolymer, and about 55 to about 85 wt % of the aromatic vinyl copolymer resin.

3. In embodiment 1 or 2, the polyether-ester-amide block copolymer may be a block copolymer of a reaction mixture comprising an aminocarboxylic acid, lactam, or diamine-dicarboxylic acid salt having 6 or more carbon atoms; a polyalkylene glycol; and dicarboxylic acid having 4 to 20 carbon atoms.

4. In embodiments 1 to 3, the silver compound may comprise at least one of metallic silver, silver oxide, silver halide, and a silver ion-containing carrier.

5. In embodiments 1 to 4, a weight ratio of the polyether-ester-amide block copolymer to the sum of the silver compound and the zinc oxide (polyether-ester-amide block copolymer:silver compound+zinc oxide) may range from about 1:0.1 to about 1:2.

6. In embodiments 1 to 5, a weight ratio of the silver compound to the zinc oxide (silver compound:zinc oxide) may range from about 1:2 to about 1:100.

7. In embodiments 1 to 6, the thermoplastic resin composition may have a virus killing time of about 15 hours or less, as measured on a specimen having a size of 5 cm×5 cm over time at 25° C. and 50% RH in accordance with ISO 21702, in which the specimen is inoculated with porcine epidemic diarrhea virus or influenza A virus fluid.

8. In embodiments 1 to 7, the thermoplastic resin composition may have a color variation (ΔE) of about 2.5 or less, as calculated according to Equation 1 based on initial color values ($L_0^*$, $a_0^*$, $b_0^*$) measured on an injection-molded specimen having a size of 50 mm×90 mm×2.5 mm using a colorimeter and color values ($L_1^*$, $a_1^*$, $b_1^*$) of the specimen measured in the same manner as above after testing for 300 hours in accordance with ASTM D4459:

$$\text{Color variation}(\Delta E) = \sqrt{(\Delta L^*)^2 + (\Delta a^*)^2 + (\Delta b^*)^2} \quad \text{[Equation 1]}$$

where $\Delta L^*$ is a difference ($L_1^* - L_0^*$) between L* values before and after testing, $\Delta a^*$ is a difference ($a_1^* - a_0^*$) between a* values before and after testing, and $\Delta b^*$ is a difference ($b_1^* - b_0^*$) between b* values before and after testing.

9. In embodiments 1 to 8, the thermoplastic resin composition may have a notched Izod impact strength of about 12 to about 30 kgf·cm/cm, as measured on a ¼" thick specimen in accordance with ASTM D256.

10. Another aspect of the present invention relates to a molded article. The molded article is formed from the thermoplastic resin composition according to any one of Embodiments 1 to 9.

11. In 10, the molded article may comprise a corrosion surface having a surface roughness of about 1 to about 50 μm on one surface thereof, as measured by a surface roughness meter.

Advantageous Effects

The present invention provides a thermoplastic resin composition having good properties in terms of low gloss, antiviral properties, weather resistance, impact resistance, and the like, and a molded article formed therefrom.

BEST MODE

Hereinafter, exemplary embodiments of the present invention will be described in detail.

A thermoplastic resin composition according to the present invention comprises: (A) a rubber-modified aromatic vinyl copolymer resin; (B) a polyether-ester-amide block copolymer; (C) a silver (Ag) compound; and (D) zinc oxide.

As used herein to represent a specific numerical range, "a to b" is defined as "≥a and ≤b".

(A) Rubber-Modified Aromatic Vinyl Copolymer Resin

The rubber-modified aromatic vinyl copolymer resin according to one embodiment of the invention serves to improve low gloss, antiviral properties, impact resistance and the like of the thermoplastic resin composition and comprises (A1) a diene-based rubber-modified vinyl graft copolymer, (A2) an acrylic rubber-modified vinyl graft copolymer, (A3) a large-diameter rubber copolymer having an average particle diameter of about 5 to about 10 μm, and (A4) an aromatic vinyl copolymer resin.

(A1) Diene-Based Rubber-Modified Vinyl Graft Copolymer

The diene-based rubber-modified vinyl graft copolymer according to one embodiment of the invention may be prepared through graft polymerization of a monomer mixture comprising an aromatic vinyl monomer and a vinyl cyanide monomer to a diene-based rubber polymer. For example, the diene-based rubber-modified vinyl graft copolymer may be prepared through graft polymerization of the monomer mixture comprising the aromatic vinyl monomer and the vinyl cyanide monomer to the diene-based rubber polymer and, optionally, the monomer mixture may further comprise a monomer for imparting processability and heat resistance. Here, polymerization may be performed by any suitable polymerization method known in the art, such as emulsion polymerization, suspension polymerization, and the like. Further, the diene-based rubber-modified vinyl graft copolymer may have a core (rubber polymer)-shell (copolymer of the monomer mixture) structure.

In some embodiments, the diene-based rubber polymer may comprise diene rubbers, such as polybutadiene, poly(styrene-butadiene), poly(acrylonitrile-butadiene), and the like, saturated rubbers prepared by adding hydrogen to the diene rubbers, and the like. These may be used alone or as a mixture thereof. For example, the diene-based rubber polymer may comprise polybutadiene rubbers. In addition, the diene-based rubber polymer (rubber particles) may have an average particle diameter (particle size) of about 200 to about 400 nm, for example, about 220 to about 380 nm. Within this range, the thermoplastic resin composition (molded article) can have good properties in terms of impact resistance, low gloss, appearance characteristics, fluidity, and the like. Here, the average (z-average) particle diameter of the diene-based rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the diene-based rubber polymer may be present in an amount of about 35 to about 80 wt %, for example, about 40 to about 75 wt %, based on 100 wt % of the diene-based rubber-modified vinyl graft copolymer. Within this range, the thermoplastic resin composition (molded article) can have good mechanical properties, moldability, and the like.

In some embodiments, the aromatic vinyl monomer may be graft copolymerizable with the diene-based rubber polymer and may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, a combination thereof, and the like. Specifically, styrene may be used. The aromatic vinyl monomer may be present in an amount of about 2 to about 40 wt %, for example, about 5 to about 35 wt %, based on 100 wt % of the diene-based rubber-modified vinyl graft copolymer. Within this range, the thermoplastic resin composition (molded article) can have good mechanical properties, moldability, and the like.

In some embodiments, the vinyl cyanide monomer is a monomer copolymerizable with the aromatic vinyl monomer and may comprise, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may comprise acrylonitrile, methacrylonitrile, and the like. The vinyl cyanide monomer may be present in an amount of about 1 to about 25 wt %, for example, about 1 to about 20 wt %, based on 100 wt % of the diene-based rubber-modified vinyl graft copolymer. Within this range, the thermoplastic resin composition (molded article) can have good mechanical properties, moldability, and the like.

In some embodiments, the monomer for imparting processability and heat resistance may comprise, for example, maleic anhydride, N-substituted maleimide, and the like. The monomer for imparting processability and heat resistance may be present in an amount of about 15 wt % or less, for example, about 0.1 to about 10 wt %, based on 100 wt % of the diene-based rubber-modified vinyl graft copolymer. Within this range, the monomer for imparting processability and heat resistance can impart processability and heat resistance to the thermoplastic resin composition (molded article) without deterioration in other properties.

In some embodiments, the diene-based rubber-modified vinyl graft copolymer may comprise a copolymer (g-ABS) prepared by grafting acrylonitrile and styrene to the butadiene diene-based rubber polymer, and the like.

In some embodiments, the diene-based rubber-modified vinyl graft copolymer may be present in an amount of about 5 to about 15 wt %, for example, about 7 to about 13 wt %, based on 100 wt % of the rubber-modified aromatic vinyl copolymer resin. Within this range, the thermoplastic resin composition (molded article) can exhibit good properties in terms of low gloss, antiviral properties, impact resistance, and the like.

(A2) Acrylic Rubber-Modified Vinyl Graft Copolymer

The acrylic rubber-modified vinyl graft copolymer according to one embodiment of the invention may be prepared through graft polymerization of a monomer mixture comprising an aromatic vinyl monomer and a vinyl cyanide monomer to an acrylic rubber polymer. For example, the acrylic rubber-modified vinyl graft copolymer may be prepared through graft polymerization of the monomer mixture comprising the aromatic vinyl monomer and the vinyl cyanide monomer to the acrylic rubber polymer and, optionally, the monomer mixture may further comprise a monomer for imparting processability and heat resistance. Here, polymerization may be performed by any suitable polymerization method known in the art, such as emulsion polymerization, suspension polymerization, and the like. Further, the acrylic rubber-modified vinyl graft copolymer may have a core (rubber polymer)-shell (copolymer of the monomer mixture) structure.

In some embodiments, the acrylic rubber polymer may comprise $C_2$ to $C_{10}$ alkyl (meth)acrylate rubbers and the like. These may be used alone or as a mixture thereof. For example, the acrylic rubber polymer may comprise butyl acrylate rubbers and the like.

In addition, the acrylic rubber polymer (rubber particles) may have an average particle diameter (particle size) of about 400 to about 600 nm, for example, about 420 to about 580 nm. Within this range, the thermoplastic resin composition (molded article) can have good properties in terms of low gloss, impact resistance, antiviral properties, and the like. Here, the average (z-average) particle diameter of the acrylic rubber polymer may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the acrylic rubber polymer may be present in an amount of about 35 to about 80 wt %, for example, about 40 to about 75 wt %, based on 100 wt % of the acrylic rubber-modified vinyl graft copolymer. Within this range, the thermoplastic resin composition (molded article) can have good mechanical properties, moldability, and the like.

In some embodiments, the aromatic vinyl monomer may be graft copolymerizable with the acrylic rubber polymer and may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, a combination thereof, and the like. Specifically, styrene may be used. The aromatic vinyl monomer may be present in an amount of about 2 to about 40 wt %, for example, about 5 to about 35 wt %, based on 100 wt % of the acrylic rubber-modified vinyl graft copolymer. Within this range, the thermoplastic resin composition (molded article) can have good mechanical properties, moldability, and the like.

In some embodiments, the vinyl cyanide monomer is a monomer copolymerizable with the aromatic vinyl monomer and may comprise, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile, methacrylonitrile, and the like. The vinyl cyanide monomer may be present in an amount of about 1 to about 25 wt %, for example, about 1 to about 20 wt %, based on 100 wt % of the acrylic rubber-modified vinyl graft copolymer. Within this range, the thermoplastic resin composition (molded article) can have good mechanical properties, moldability, and the like.

In some embodiments, the monomer for imparting processability and heat resistance may comprise, for example, maleic anhydride, N-substituted maleimide, and the like. The monomer for imparting processability and heat resistance may be present in an amount of about 15 wt % or less, for example, about 0.1 to about 10 wt %, based on 100 wt % of the acrylic rubber-modified vinyl graft copolymer. Within this range, the monomer for imparting processability and heat resistance can impart processability and heat resistance to the thermoplastic resin composition (molded article) without deterioration in other properties.

In some embodiments, the acrylic rubber-modified vinyl graft copolymer may comprise a copolymer (g-ABS) prepared by grafting acrylonitrile and styrene monomer to a butyl acrylate rubber polymer, and the like.

In some embodiments, the acrylic rubber-modified vinyl graft copolymer may be present in an amount of about 5 to about 20 wt %, for example, about 7 to about 18 wt %, based on 100 wt % of the rubber-modified aromatic vinyl copolymer resin. Within this range, the thermoplastic resin composition (molded article) can exhibit good properties in terms of low gloss, antiviral properties, impact resistance, and the like.

(A3) Large-Diameter Rubber Copolymer

The large-diameter rubber copolymer according to one embodiment of the invention may have an average particle diameter of about 5 to about 10 μm, for example, about 5.5 to about 9.5 μm, and serves to improve low gloss, and the like of the thermoplastic resin composition. If the average particle diameter of the large-diameter rubber polymer is less than about 5 μm, the thermoplastic resin composition can suffer from deterioration in low gloss, antiviral properties, and the like, and if the average particle diameter of the large-diameter rubber polymer exceeds about 10 μm, the thermoplastic resin composition (molded product) can suffer from deterioration in impact resistance, appearance characteristics, and the like. Here, the average particle diameter (z-average) of the large-diameter rubber polymer may be measured using a pellet-dissolved DMF solution by a particle sizer (SYMPATEC) after zero adjustment with pure DMF placed in a specimen inlet, in which the DMF solution is prepared by dissolving pellets of the rubber polymer prepared through continuous polymerization to a concentration of 3% to 5% in DMF.

In some embodiments, the large-diameter rubber polymer may be present in the form of a rubber-modified aromatic vinyl copolymer resin (a mixture of some or all of (A3) a large-diameter rubber polymer having a dispersed phase and an average particle diameter of about 5 to about 10 μm and (A4) an aromatic vinyl copolymer resin having a continuous phase) prepared through continuous solution polymerization of a rubber polymer having a viscosity of about 150 cP or more in a 5 wt % styrene solution, an aromatic vinyl monomer, and a monomer copolymerizable with the aromatic vinyl monomer.

Specifically, the large-diameter rubber polymer (in the form of the rubber-modified aromatic vinyl copolymer resin)

may be prepared by mixing a polymerization initiator and a molecular weight regulator with a mixed solution of the rubber polymer, the aromatic vinyl monomer, and the monomer copolymerizable with the aromatic vinyl monomer in a solvent to prepare a reaction solution; introducing the reaction solution into a first reactor, followed by polymerization of the reaction solution to a conversion ratio of about 30 to about 40%; and introducing a polymerized product prepared in the first reactor into a second reactor, followed by polymerization of the polymerized product to a conversion ratio of about 70 to about 80%.

In some embodiments, the mixed solution may comprise about 3 to about 20 wt % of the rubber polymer, about 50 to about 85 wt % of the aromatic vinyl monomer and the monomer copolymerizable with the aromatic vinyl monomer, and about 5 to about 30 wt % of the solvent.

In some embodiments, the rubber polymer included in the mixed solution may comprise, for example, diene rubbers (rubber polymers), such as polybutadiene, poly(styrene-butadiene), poly(acrylonitrile-butadiene), and the like; saturated rubbers obtained by adding hydrogen to the diene rubbers; isoprene rubbers; acrylate rubbers (rubber polymers), such as poly(butyl acrylate) and the like; ethylene-propylene-diene terpolymer (EPDM), and the like. These may be used alone or as a mixture thereof. For example, the rubber polymer may be diene rubbers, specifically polybutadiene rubbers. In addition, the rubber polymer may have a viscosity of about 150 cP or more, for example, about 150 to about 300 cP, specifically about 160 to about 200 cP, in a 5 wt % styrene solution. Within this range of viscosity in the styrene solution, the large-diameter rubber polymer can be prepared.

In some embodiments, the aromatic vinyl monomer included in the mixed solution may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof.

In some embodiments, the monomer copolymerizable with the aromatic vinyl monomer included in the mixed solution may comprise, for example, vinyl cyanide monomers, such as acrylonitrile, methacrylonitrile, ethacrylonitrile, phenyl acrylonitrile, α-chloroacrylonitrile, fumaronitrile, and the like. These may be used alone or as a mixture thereof.

In some embodiments, the aromatic vinyl monomer may be present in an amount of about 20 to about 90 wt %, for example, about 30 to about 80 wt %, based on 100 wt % of the aromatic vinyl monomer and the monomer copolymerizable with the aromatic vinyl monomer, and the monomer copolymerizable with the aromatic vinyl monomer may be present in an amount of about 10 to about 80 wt %, for example, about 20 to about 70 wt %, based on 100 wt % of the aromatic vinyl monomer and the monomer copolymerizable with the aromatic vinyl monomer.

In some embodiments, the solvent may be an aromatic organic solvent. For example, the solvent may comprise ethyl benzene, xylene, toluene, and the like. These may be used alone or as a mixture thereof.

In some embodiments, the polymerization initiator may have a half-life of 10 minutes or less at a reactor polymerization temperature and may comprise, for example, radical initiators, such as 1,1-bis(t-butylperoxy)-2-methylcyclohexane, 1,1-bis(t-butylperoxy)cyclohexane, 2-bis(4,4-di-t-butylperoxy cyclohexane)propane, t-hexylperoxy isopropyl monocarbonate, t-butylperoxy maleic acid, t-butylperoxy-3, 5,5-trimethylhexanoate, t-butylperoxy laurate, 2,5-dimethyl-2,5-bis(m-toluoylperoxy)hexane, t-butylperoxy isopropyl monocarbonate, t-butylperoxy 2-ethylhexyl monocarbonate, t-hexylperoxy benzoate, 2,5-dimethyl-2,5-bis(benzoylperoxy)hexane, t-butylperoxy acetate, 2,2-bis(t-butylperoxy)butane, t-butylperoxy benzoate, n-butyl-4,4-bis(t-butylperoxy)valerate, mixtures thereof, and the like. The polymerization initiator may be present in an amount of about 0.007 to about 0.07 parts by weight, for example, about 0.01 to about 0.05 parts by weight, relative to about 100 parts by weight of the mixed solution. Within this range, it is possible to reduce deterioration in appearance characteristics and the like of the thermoplastic resin composition due to remaining polymerization initiator.

In some embodiments, the molecular weight regulator may comprise alkyl mercaptans, such as t-dodecyl mercaptan, n-dodecyl mercaptan, and the like. The molecular weight regulator may be present in an amount of about 0.02 to about 1 part by weight, for example, about 0.03 to about 0.5 parts by weight, relative to about 100 parts by weight of the mixed solution.

In some embodiments, continuous solution polymerization is preferably performed while circulating a refrigerant through a jacket, a coil, or the like, so as to control exothermic reaction that can occur in the reactors during the polymerization process.

In some embodiments, the reaction solution with the polymerization initiator and the molecular weight regulator added thereto may be polymerized to a conversion ratio of about 20 to about 40%, for example, about 22 to about 38%, in the first reactor. Within this range, stable polymerization can be achieved without excessive load of a stirrer.

In some embodiments, the reaction temperature in the first reactor may range from about 60 to about 150° C., for example, about 70 to about 130° C. Here, the reaction temperature may be varied depending on the type of reactor, stirring rate, the type of polymerization initiator used, and the like.

In some embodiments, the stirring rate in the first reactor may range from about 60 to about 150 rpm, for example, about 80 to about 120 rpm, specifically about 90 to about 130 rpm. Here, the stirring rate may be varied depending on reactor size, the type of polymerization initiator, reaction temperature, and the like. Within this range, the large-diameter rubber polymer can be prepared.

In some embodiments, the polymerized product prepared in the first reactor may be polymerized to a conversion ratio of about 70 to about 80% in the second reactor. Within this range, the large-diameter rubber polymer can be prepared.

In some embodiments, the reaction temperature in the second reactor may range from about 80 to about 170° C., for example, about 120 to about 160° C. Here, the reaction temperature may be varied depending on the type of reactor, stirring rate, the type of polymerization initiator used, and the like.

In some embodiments, the stirring rate in the second reactor may range from about 50 to about 100 rpm, for example, about 60 to about 95 rpm, specifically about 65 to about 90 rpm. Here, the stirring rate may be varied depending on reactor size, the type of polymerization initiator, reaction temperature, and the like. Within this range, the large-diameter rubber polymer can be prepared.

In some embodiments, continuous solution polymerization may further include removing unreacted monomers and a solvent residue by devolatilizing the polymerized product prepared in the second reactor. Here, the devolatilization process may be performed using a devolatilization tank. In one embodiment, the devolatilization process may be performed using a single devolatilization tank. In another embodiment, the devolatilization process may be performed using a first devolatilization tank and a second devolatilization tank vertically connected to each other to remove remaining unreacted material. Through the devolatilization process, the content of residual monomers in the polymerized product may be reduced to about 1,500 ppm or less, for example, about 1,000 ppm or less, specifically about 700 ppm or less.

In some embodiments, the devolatilization tank (devolatilization device) may be a fall-stranding devolatilization tank (DEVO). Here, the angle of a cone of the fall-stranding devolatilization tank is set to minimize a retention time in the devolatilization tank and to effectively transfer a devolatilized product to an underlying gear pump.

In some embodiments, the first devolatilization tank and the second devolatilization tank may be vertically connected to each other to minimize a connection line between the DEVOs. In addition, it is desirable that the first devolatilization tank DV-1 be provided with a control valve or a regulator to regulate pressure thereof.

In some embodiments, the first devolatilization tank may be operated under conditions of a pressure of about 100 to about 600 torr, for example, about 200 to about 500 torr, a temperature of about 160 to about 240° C., for example, about 180 to about 220° C., and a retention time of about 10 minutes or less. Within these ranges, reduction in impurities, such as remaining monomers and the like, and high productivity can be achieved. In addition, the second devolatilization tank may be operated under conditions of a pressure of about 1 to about 50 torr, a temperature of about 210 to about 250° C., and a retention time of about 10 minutes or less, for example, 5 minutes or less. Within these ranges, the prepared rubber-modified aromatic vinyl copolymer resin can have good properties in terms of color and the like.

In some embodiments, the aromatic vinyl copolymer resin produced in preparation of the large-diameter rubber polymer (in the form of the rubber-modified aromatic vinyl copolymer resin) may have a weight average molecular weight (Mw) of about 10,000 to about 300,000 g/mol, for example, about 15,000 to about 200,000 g/mol, as measured by gel permeation chromatography (GPC). Within this range, the thermoplastic resin composition can have good properties in terms of mechanical strength, moldability, and the like.

Here, the aromatic vinyl copolymer produced in preparation of the large-diameter rubber polymer (in the form of the rubber-modified aromatic vinyl copolymer resin) may have the same composition as the aromatic vinyl copolymer resin (A4), or the content of the aromatic vinyl copolymer resin (A4) of the thermoplastic resin composition may be satisfied by adding a separate (second) aromatic vinyl copolymer resin in addition to the (first) aromatic vinyl copolymer resin produced in preparation of the large-diameter rubber polymer (in the form of the rubber-modified aromatic vinyl copolymer resin).

In some embodiments, the large-diameter rubber copolymer may be present in an amount of about 1 to about 5 wt %, for example, about 1.5 to about 4 wt %, based on 100 wt % of the rubber-modified aromatic vinyl copolymer resin. Within this range, the thermoplastic resin composition (molded product) can have good properties in terms of low gloss, antiviral properties, impact resistance, and the like.

(A4) Aromatic Vinyl Copolymer Resin

The aromatic vinyl copolymer resin according to one embodiment of the invention may comprise an aromatic vinyl copolymer resin used in typical rubber-modified aromatic vinyl copolymer resins. For example, the aromatic vinyl copolymer resin may be a polymer of a monomer mixture comprising an aromatic vinyl monomer and a vinyl cyanide monomer. Here, the aromatic vinyl copolymer resin (A4) may be present in the total amount of the aromatic vinyl copolymer resin (A4) of the thermoplastic resin composition by adding a separate aromatic vinyl copolymer resin in addition to the aromatic vinyl copolymer resin produced in preparation of the large-diameter rubber polymer (in the form of a rubber-modified aromatic vinyl copolymer resin).

In some embodiments, the aromatic vinyl copolymer resin may be prepared by mixing the aromatic vinyl monomer with the vinyl cyanide monomer, followed by polymerization of the mixture. Here, polymerization may be performed by any suitable polymerization method known in the art, such as emulsion polymerization, suspension polymerization, bulk polymerization, and the like.

In some embodiments, the aromatic vinyl monomer may comprise styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 20 to about 90 wt %, for example, about 30 to about 80 wt %, based on 100 wt % of the aromatic vinyl copolymer resin. Within this range, the thermoplastic resin composition can have good properties in terms of impact resistance, fluidity, appearance characteristics, and the like.

In some embodiments, the vinyl cyanide monomer may comprise acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may comprise acrylonitrile, methacrylonitrile, and the like. The vinyl cyanide monomer may be present in an amount of about 10 to about 80 wt %, for example, about 20 to about 70 wt %, based on 100 wt % of the aromatic vinyl copolymer resin. Within this range, the thermoplastic resin composition can have good properties in terms of impact resistance, fluidity, heat resistance, appearance characteristics, and the like.

In some embodiments, the aromatic vinyl copolymer resin may further comprise a monomer for imparting processability and heat resistance to the monomer mixture. The monomer for imparting processability and heat resistance may comprise, for example, (meth)acrylic acid, N-substituted maleimide, and the like, without being limited thereto. The monomer for imparting processability and heat resistance may be present in an amount of about 15 wt % or less, for example, about 0.1 to about 10 wt %, based on 100 wt % of the monomer mixture. Within this range, the monomer for imparting processability and heat resistance can impart processability and heat resistance to the thermoplastic resin composition (molded article) without deterioration in other properties.

In some embodiments, the aromatic vinyl copolymer resin may have a weight average molecular weight (Mw) of about 10,000 to about 300,000 g/mol, for example, about 15,000 to about 200,000 g/mol, as measured by gel permeation chromatography (GPC). Within this range, the thermoplastic resin composition (molded article) can have good mechanical strength, moldability, and the like.

In some embodiments, the aromatic vinyl copolymer resin may be present in an amount of about 55 to about 85 wt %, for example, about 60 to about 80 wt %, based on 100 wt % of the rubber-modified aromatic vinyl copolymer resin. Within this range, the thermoplastic resin composition can exhibit good properties in terms of transparency, impact resistance, fluidity (moldability), and the like.

(B) Polyether-Ester-Amide Block Copolymer

The polyether-ester-amide block copolymer according to one embodiment of the invention serves to improve low gloss, antiviral properties, weather resistance, impact resistance, and the like of the thermoplastic resin composition (molded product) together with the silver compound and zinc oxide in the rubber-modified aromatic vinyl copolymer resin, and may be a block copolymer of a reaction mixture comprising an amino-carboxylic acid, lactam or diamine-dicarboxylic acid salt having 6 or more carbon atoms; a polyalkylene glycol; and a dicarboxylic acid having 4 to 20 carbon atoms.

In some embodiments, the aminocarboxylic acid, lactam, or diamine-dicarboxylic acid salt having 6 or more carbon atoms may comprise aminocarboxylic acids, such as ω-aminocaproic acid, ω-aminoenanthic acid, ω-aminocaprylic acid, ω-aminophelconic acid, ω-aminocapric acid, 1,1-aminoundecanoic acid, 1,2-aminododecanoic acid, and the like; lactams, such as caprolactam, enantolactam, capryl lactam, lauryl lactam, and the like; and salts of diamines and dicarboxylic acids, such as salts of hexamethylenediamine-adipic acid, salts of hexamethylenediamine-isophthalic acid, and the like. For example, 1,2-aminododecanoic acid, caprolactam, and salts of hexamethylenediamine-adipic acid, and the like may be used.

In some embodiments, the polyalkylene glycol may comprise polyethylene glycol, poly(1,2- and 1,3-propylene glycol), polytetramethylene glycol, polyhexamethylene glycol, a block or random copolymer of ethylene glycol and propylene glycol, a copolymer of ethylene glycol and tetrahydrofuran, and the like. For example, polyethylene glycol, a copolymer of ethylene glycol and propylene glycol, and the like may be used.

In some embodiments, the $C_4$ to $C_{20}$ dicarboxylic acid may comprise terephthalic acid, 1,4-cyclohexacarboxylic acid, sebacic acid, adipic acid, dodecane carboxylic acid, and the like.

In some embodiments, a bond between the aminocarboxylic acid, lactam or diamine-dicarboxylic acid salt having 6 or more carbon atoms and the polyalkylene glycol may be an ester bond; a bond between the aminocarboxylic acid, lactam or diamine-dicarboxylic acid salt having 6 or more carbon atoms and the $C_4$ to $C_{20}$ dicarboxylic acid may be an amide bond; and a bond between the polyalkylene glycol and the $C_4$ to $C_{20}$ dicarboxylic acid may be an ester bond.

In some embodiments, the polyether-ester-amide block copolymer may be prepared by a method well-known in the art, for example, by a method disclosed in JP Patent Publication No. S56-045419 or JP Unexamined Patent Publication No. S55-133424.

In some embodiments, the polyether-ester-amide block copolymer may comprise about 10 to about 95 wt % of the polyether-ester block. Within this range, the thermoplastic resin composition (molded product) can have good antiviral properties, impact resistance, and the like.

In some embodiments, the polyether-ester-amide block copolymer may be present in an amount of about 5 to about 25 parts by weight, for example, about 8 to about 22 parts by weight, relative to about 100 parts by weight of the rubber-modified aromatic vinyl copolymer resin. If the content of the polyether-ester-amide block copolymer is less than about 5 parts by weight relative to about 100 parts by weight of the rubber-modified aromatic vinyl copolymer resin, the thermoplastic resin composition (molded product) can suffer from deterioration in antiviral properties, low gloss, impact resistance, and the like, and if the content of the polyether-ester-amide block copolymer exceeds about 25 parts by weight, the thermoplastic resin composition (molded product) can suffer from deterioration in weather resistance, heat stability, and the like.

(C) Silver (Ag) Compound

The silver compound according to one embodiment of the invention serves to improve low gloss, antiviral properties, weather resistance, impact resistance, and the like of the thermoplastic resin composition (molded product) together with the polyether-ester-amide block copolymer and zinc oxide in the rubber-modified aromatic vinyl copolymer resin. The silver compound is an antibacterial agent and may comprise any compound containing a silver component without limitation, for example, metallic silver, silver oxide, silver halide, a silver ion-containing carrier, combinations thereof, and the like. Among these silver compounds, a silver ion-containing carrier may be used. The carrier may comprise zeolite, silica gel, calcium phosphate, zirconium phosphate, phosphate-sodium-zirconium, phosphate-sodium-hydrogen-zirconium, and the like. The carrier may have a porous structure. Since the carrier having a porous structure allows silver to be retained therein, the porous structure of the carrier allows not only increase in silver content, but also improvement in silver retention performance. Specifically, the silver compound may be silver sodium hydrogen zirconium phosphate and the like.

In some embodiments, the silver compound may have an average particle size (D50) of about 15 µm or less, for example, about 0.1 to about 12 µm, as measured using a particle analyzer (Laser Diffraction Particle Size Analyzer LS 13 320, Beckman Coulter).

In some embodiments, the silver compound may be present in an amount of about 0.05 to about 1.5 parts by weight, for example, about 0.1 to about 1.2 parts by weight, relative to about 100 parts by weight of the rubber-modified aromatic vinyl copolymer resin. If the content of the silver compound is less than about 0.05 parts by weight relative to about 100 parts by weight of the rubber-modified aromatic vinyl copolymer resin, the thermoplastic resin composition (molded product) can suffer from deterioration in antiviral properties, antibacterial properties, and the like, and if the content of the silver compound exceeds about 1.5 parts by weight, the thermoplastic resin composition (molded product) can suffer from deterioration in weather resistance, impact resistance, and the like.

(D) Zinc Oxide

The zinc oxide according to the present invention serves to improve low gloss, antiviral properties, weather resistance, impact resistance, and the like of the thermoplastic resin composition (molded product) together with the polyether-ester-amide block copolymer and zinc oxide in the rubber-modified aromatic vinyl copolymer resin, and may be zinc oxide used in a typical thermoplastic resin composition.

In some embodiments, the zinc oxide is composed of primary particles (single particle) and secondary particles formed by agglomeration of the primary particles, in which the primary particles may have an average particle size (D50) of about 1 to about 50 nm, for example, about 1 to about 30 nm and the secondary particles may have an average particle size (D50) of about 0.1 to about 10 µm, for example, about 0.5 to about 5 µm, as measured using a particle analyzer (Laser Diffraction Particle Size Analyzer LS 13 320, Beckman Coulter). Within this range, thermoplastic resin composition (molded product) can have good properties in terms of antiviral properties, antibacterial properties, impact resistance, and the like.

In some embodiments, the zinc oxide may be present in an amount of about 1 to about 15 parts by weight, for example, about 2 to about 12 parts by weight, relative to about 100 parts by weight of the rubber-modified aromatic vinyl copolymer resin. If the content of the zinc oxide is less than about 1 part by weight relative to about 100 parts by weight of the rubber-modified aromatic vinyl copolymer resin, the thermoplastic resin composition (molded product) can suffer from deterioration in antiviral properties, antibacterial properties, and the like, and if the content of the zinc oxide exceeds about 15 parts by weight, the thermoplastic resin composition (molded product) can suffer from deterioration in low gloss, impact resistance, coloration, and the like.

In some embodiments, the weight ratio of the polyether-ester-amide block copolymer to the sum of the silver compound and the zinc oxide (polyether-ester-amide block copolymer:silver compound+zinc oxide) may range from about 1:0.1 to about 1:2, for example, about 1:0.15 to about 1:1.5. Within this range, the thermoplastic resin composition (molded product) can exhibit better properties in terms of low gloss, antiviral properties, weather resistance, impact resistance, and the like.

In some embodiments, the weight ratio of the silver compound to the zinc oxide (silver compound:zinc oxide) may range from about 1:2 to about 1:100, for example, about 1:3 to about 1:80. Within this range, the thermoplastic resin composition (molded product) can exhibit better properties in terms of antiviral properties, weather resistance, impact resistance, and the like.

The thermoplastic resin composition according to one embodiment of the invention may further include additives used for typical thermoplastic resin compositions. Examples of the additives may comprise flame retardants, fillers, antioxidants, anti-dripping agents, lubricants, release agents, nucleating agents, stabilizers, pigments, dyes, mixtures thereof, and the like, without being limited thereto. The additives may be present in an amount of about 0.001 to about 40 parts by weight, for example, about 0.1 to about 10 parts by weight, relative to about 100 parts by weight of the rubber-modified aromatic vinyl copolymer resin.

The thermoplastic resin composition according to one embodiment of the invention may be prepared in pellet form by mixing the aforementioned components, followed by melt extrusion at about 200 to about 280° C., for example, about 220 to about 250° C., using a typical twin-screw extruder.

In some embodiments, the thermoplastic resin composition has antibacterial properties and may have a surface gloss of about 40 to about 70%, for example, about 50 to about 67%, as measured on a 3.2 mm thick specimen at angle of 85° in accordance with ASTM D523. If the gloss of the thermoplastic resin composition exceeds 70%, the thermoplastic resin composition (molded product) can suffer from deterioration in antiviral properties, impact resistance, and the like.

In some embodiments, the thermoplastic resin composition may have a virus killing time of about 15 hours or less, for example, about 1 to about 13 hours, as measured on a specimen having a size of 5 cm×5 cm over time at 25° C. and 50% RH in accordance with ISO 21702, in which the specimen is inoculated with porcine epidemic diarrhea virus or influenza A virus fluid.

In some embodiments, the thermoplastic resin composition may have a color variation ($\Delta E$) of about 2.5 or less, for example, about 1 to about 2, as calculated according to Equation 1 based on initial color values ($L_0^*$, $a_0^*$, $b_0^*$) measured on an injection-molded specimen having a size of 50 mm×90 mm×2.5 mm using a colorimeter and color values ($L_1^*$, $a_1^*$, $b_1^*$) of the specimen measured in the same manner as above after testing for 300 hours in accordance with ASTM D4459.

$$\text{Color variation}(\Delta E) = \sqrt{(\Delta L^*)^2 + (\Delta a^*)^2 + (\Delta b^*)^2} \quad \text{[Equation 1]}$$

where $\Delta L^*$ is a difference ($L_1^* - L_0^*$) between L* values before and after testing, $\Delta a^*$ is a difference ($a_1^* - a_0^*$) between a* values before and after testing, and $\Delta b^*$ is a difference ($b_1^* - b_0^*$) between b* values before and after testing.

In some embodiments, the thermoplastic resin composition may have a notched Izod impact strength of about 12 to about 30 kgf·cm/cm, for example, about 14 to about 25 kgf·cm/cm, as measured on a ¼" thick specimen in accordance with ASTM D256.

A molded article according to the present invention is produced from the thermoplastic resin composition set forth above. The thermoplastic resin composition may be prepared in pellet form. The prepared pellets may be produced into various molded articles (products) by various molding methods, such as injection molding, extrusion molding, vacuum molding, casting, and the like. These molding methods are well known to those skilled in the art.

In some embodiments, the molded article has good properties in terms of low gloss, antiviral properties, weather resistance, impact resistance, balance therebetween, and the like, and thus can be advantageously used as antiviral exterior materials of low glass products that are subjected to frequent body contact.

In some embodiments, the molded article may comprise a corrosion surface having a surface roughness of about 1 to about 50 μm, for example, about 5 to about m, on one surface thereof, as measured by a surface roughness meter. A method for forming a corrosion surface is well known to a person having ordinary knowledge in the art. Within this range of surface roughness, the molded article can exhibit better antiviral properties, and the like, and can provide a low gloss product.

In some embodiments, the molded article including the corrosion surface may have a corrosion surface gloss of about 0.5 to about 40%, for example, about 1 to about 20%, as measured on a 3.2 mm thick specimen at angle of 85° in accordance with ASTM D523. Within this range, the molded article can have better properties in terms of low gloss, antiviral properties, weather resistance, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.
(A) Rubber-Modified Aromatic Vinyl Copolymer Resin
A rubber-modified aromatic vinyl copolymer resin comprising (A1) a diene-based rubber-modified vinyl graft copolymer, (A2) an acrylic rubber-modified vinyl graft copolymer, (A3) a large-diameter rubber copolymer, (A4) a rubber-modified vinyl graft copolymer, and (A5) an aromatic vinyl copolymer resin in amounts as listed in Tables 1, 2 and 3 was used.

(A1) Diene-Based Rubber-Modified Vinyl Graft Copolymer

A core-shell graft copolymer (g-ABS) obtained through graft polymerization of 42 wt % of styrene and acrylonitrile (styrene/acrylonitrile, 31.5 wt %/10.5 wt %) to 58 wt % of butadiene rubber having an average particle diameter of 300 nm was used.

(A2) Acrylic Rubber-Modified Vinyl Graft Copolymer

A core-shell graft copolymer (g-ABS) obtained through graft polymerization of 50 wt % of styrene and acrylonitrile (styrene/acrylonitrile, 33.5 wt %/16.5 wt %) to 50 wt % of butyl acrylate rubber having an average particle diameter of 500 nm was used.

(A3) Large-Diameter Rubber Polymer 7.5 parts by weight of butadiene rubber (BR-LV: INTENE 50AF) having a viscosity of 170 cP in a 5 wt % styrene solution was dissolved in a mixed solution consisting of 69.5 parts by weight of styrene and acrylonitrile (styrene:acrylonitrile (weight ratio)=78.7:21.3) and 23 parts by weight of toluene as a reaction solvent, followed by adding 0.015 parts by weight of 1,1-bis(t-butylperoxy)cyclohexane as a polymerization initiator and 0.08 parts by weight of t-dodecyl mercaptan as a molecular weight regulator, thereby preparing a mixed solution. The mixed solution was introduced into reactors at a rate of 25 kg/hr. In a first reactor, the mixed solution was stirred at a rate of 90 rpm and subjected to polymerization to a conversion ratio of 25%. In a second reactor, the resulting product prepared in the first reactor was stirred at a rate of 90 rpm and subjected to polymerization to a conversion ratio of 75%, followed by removal of remaining unreacted material through a devolatilization tank, thereby preparing a mixture of a rubber-modified aromatic vinyl copolymer resin (mixture of the large-diameter rubber polymer (A3, dispersed phase) and the aromatic vinyl copolymer resin (SAN resin, A5, continuous phase) in pellet form (large-diameter rubber polymer (A3, dispersed phase):aromatic vinyl copolymer resin (A5, continuous phase) (weight ratio)=12.7:87.3). Here, the large-diameter rubber polymer (A3) had an average particle diameter of 8 μm and the SAN resin (A5) had a weight average molecular weight of 130,000 g/mol.

(A4) Rubber-modified vinyl graft copolymer

A core-shell graft copolymer (g-ABS) obtained through graft polymerization of 42 wt % of styrene and acrylonitrile (styrene/acrylonitrile, 31.5 wt %/10.5 wt %) to 58 wt % of butadiene acrylate rubber having an average particle diameter of 500 nm was used.

(A5) Aromatic Vinyl Copolymer Resin

A SAN resin (weight average molecular weight: 130,000 g/mol) prepared through polymerization of styrene (78.7 wt %) and acrylonitrile (21.3 wt %) was used.

(B) Block Copolymer (B1) A polyamide-6-polyethylene oxide block copolymer (PA6-b-PEO, Manufacturer: Sanyo Chemical Co., Ltd., Product Name: PELECTRON AS) was used.

(B2) A polypropylene-polyethylene oxide block copolymer (PP-b-PEO, Manufacturer: Sanyo Chemical Co., Ltd., Product Name: PELECTRON PVL, index of refraction: 1.50) was used.

(C) Silver (Ag) Compound

Silver phosphate glass (Manufacturer: Fuji Chemical Industries Ltd., Product Name: BM-102SD) was used.

(D) Zinc Oxide

Zinc oxide (Manufacturer: SH Evergy & Chemical Co., Ltd., Product Name: ANYZON) was used.

Examples 1 to 7 and Comparative Examples 1 to 10

The above components were mixed in amounts as listed in Tables 1, 2 and 3 and subjected to extrusion at 230° C., thereby preparing pellets. Here, for the rubber-modified aromatic vinyl copolymer resin (A), a rubber-modified aromatic vinyl copolymer resin, in which the large-diameter rubber polymer (A3, dispersed phase) is dispersed in the aromatic vinyl copolymer resin (A5, continuous phase), was prepared. Then, the diene-based rubber-modified vinyl graft copolymer (A1), the acrylic rubber-modified vinyl graft copolymer (A2) and/or the rubber-modified vinyl graft copolymer (A4) were additionally prepared and a separate aromatic vinyl copolymer resin (A5) was added to satisfy the content of the rubber-modified aromatic vinyl copolymer resin (A). In addition, extrusion was performed using a twin-screw extruder (L/D=36, diameter: 45 mm) and the pellets were dried at 80° C. for 2 hours or more and injection-molded in a 6 oz. injection molding machine (molding temperature: 230° C., mold temperature: 60° C.), thereby preparing specimens. The specimens were evaluated as to the following properties by the following method, and results are shown in Tables 1, 2 and 3.

Property Evaluation (1) Surface gloss (unit: %): Surface gloss was measured on a 3.2 mm thick specimen at angle of 600 using a BYK-Gardner gloss meter (BYK) in accordance with ASTM D523.

(2) Antiviral properties: Virus killing time (unit: hour) was measured on a specimen having a size of 5 cm×5 cm over time at 25° C. and 50% RH in accordance with ISO 21702, in which the specimen was inoculated with porcine epidemic diarrhea virus or influenza A virus fluid.

(3) Color variation (ΔE): Color variation (ΔE) was calculated according to Equation 1 based on initial color values ($L_0^*$, $a_0^*$, $b_0^*$) measured on an injection-molded specimen having a size of 50 mm×90 mm×2.5 mm using a colorimeter (CM-3700A, KONICA MINOLTA) and color values ($L_1^*$, $a_1^*$, $b_1^*$) measured in the same manner as above after testing for 300 hours in accordance with ASTM D4459.

$$\text{Color variation}(\Delta E)=\sqrt{(\Delta L^*)^2+(\Delta a^*)^2+(\Delta b^*)^2} \quad \text{[Equation 1]}$$

where $\Delta L^*$ is a difference ($L_1^*-L_0^*$) between L* values before and after testing, $\Delta a^*$ is a difference ($a_1^*-a_0^*$) between a* values before and after testing, and $\Delta b^*$ is a difference ($b_1^*-b_0^*$) between b* values before and after testing.

(4) Notched Izod impact strength (unit: kgf-cm/cm): Notched Izod impact strength was measured on a ¼" thick specimen in accordance with ASTM D256.

TABLE 1

| | Example | | | | | | |
|---|---|---|---|---|---|---|---|
| | 1 | 2 | 3 | 4 | 5 | 6 | 7 |
| (A1) (wt %) | 10 | 10 | 10 | 10 | 10 | 10 | 10 |
| (A2) (wt %) | 13 | 13 | 13 | 13 | 13 | 13 | 13 |
| (A3) (wt %) | 2.5 | 2.5 | 2.5 | 2.5 | 2.5 | 2.5 | 2.5 |
| (A4) (wt %) | — | — | — | — | — | — | — |
| (A5) (wt %) | 74.5 | 74.5 | 74.5 | 74.5 | 74.5 | 74.5 | 74.5 |
| (B1) (parts by weight) | 8 | 15 | 22 | 15 | 15 | 15 | 15 |
| (B2) (parts by weight) | — | — | — | — | — | — | — |

TABLE 1-continued

|  | Example | | | | | | |
| --- | --- | --- | --- | --- | --- | --- | --- |
|  | 1 | 2 | 3 | 4 | 5 | 6 | 7 |
| (C) (parts by weight) | 0.6 | 0.6 | 0.6 | 0.1 | 1.2 | 0.6 | 0.6 |
| (D) (parts by weight) | 8 | 8 | 8 | 8 | 8 | 2 | 12 |
| Surface gloss | 65 | 62 | 55 | 60 | 65 | 52 | 67 |
| PEDV killing time | 10 | 6 | 2 | 9 | 5 | 9 | 5 |
| Influenza A killing time | 10 | 6 | 2 | 9 | 5 | 9 | 5 |
| Color variation (ΔE) | 1.3 | 1.5 | 1.8 | 1.2 | 2 | 1.7 | 1.4 |
| Notched Izod impact strength | 14 | 16 | 18 | 20 | 14 | 18 | 15 |

* parts by weight: parts by weight relative to 100 parts by weight of rubber-modified aromatic vinyl copolymer resin (A)

TABLE 2

|  | Comparative Example | | | | | |
| --- | --- | --- | --- | --- | --- | --- |
|  | 1 | 2 | 3 | 4 | 5 | 6 |
| (A1) (wt %) | 10 | 10 | 10 | 10 | 10 | 10 |
| (A2) (wt %) | 13 | — | 13 | 13 | 13 | 13 |
| (A3) (wt %) | — | 2.5 | 2.5 | 2.5 | 2.5 | 2.5 |
| (A4) (wt %) | 2.5 | 13 | — | — | — | — |
| (A5) (wt %) | 74.5 | 74.5 | 74.5 | 74.5 | 74.5 | 74.5 |
| (B1) (parts by weight) | 15 | 15 | 4 | — | 28 | — |
| (B2) (parts by weight) | — | — | — | — | — | 15 |
| (C) (parts by weight) | 0.6 | 0.6 | 0.6 | 0.6 | 0.6 | 0.6 |
| (D) (parts by weight) | 8 | 8 | 8 | 8 | 8 | 8 |
| surface gloss | 85 | 75 | 70 | 75 | 55 | 65 |
| PEDV killing time | 10 | 9 | 24 | 48 | 3 | 6 |
| Influenza A killing time | 10 | 9 | 24 | 48 | 3 | 6 |
| Color variation(ΔE) | 1.5 | 3.5 | 1.2 | 1.2 | 3 | 1.5 |
| Notched Izod impact strength | 22 | 20 | 11 | 22 | 20 | 10 |

* parts by weight: parts by weight relative to 100 parts by weight of rubber-modified aromatic vinyl copolymer resin (A)

TABLE 3

|  | Comparative Example | | | |
| --- | --- | --- | --- | --- |
|  | 7 | 8 | 9 | 10 |
| (A1) (wt %) | 10 | 10 | 10 | 10 |
| (A2) (wt %) | 13 | 13 | 13 | 13 |
| (A3) (wt %) | 20 | 20 | 20 | 20 |
| (A4) (wt %) | — | — | — | — |
| (A5) (wt %) | 57 | 57 | 57 | 57 |
| (B1) (parts by weight) | 15 | — | — | — |
| (B2) (parts by weight) | — | — | — | — |
| (C) (parts by weight) | 0.01 | 2 | 0.6 | 0.6 |
| (D) (parts by weight) | 8 | 8 | 0.01 | 16 |
| surface gloss | 60 | 68 | 50 | 75 |
| PEDV killing time | 17 | 5 | 17 | 5 |
| Influenza A killing time | 17 | 5 | 17 | 5 |
| Color variation(ΔE) | 1 | 4 | 2 | 1.3 |
| Notched Izod impact strength | 18 | 10 | 17 | 10 |

* parts by weight: parts by weight relative to 100 parts by weight of rubber-modified aromatic vinyl copolymer resin (A)

From the results, it could be seen that the thermoplastic resin compositions according to the present invention had good properties in terms of low gloss (surface gloss), antiviral properties (virus killing time), weather resistance (color variation (ΔE)), impact resistance (Notched Izod impact strength), and the like.

Conversely, it could be seen that the thermoplastic resin composition of Comparative Example 1, which was prepared using the rubber-modified vinyl graft copolymer (A5) comprising a diene-based rubber polymer having an average particle diameter of 500 nm instead of the large-diameter rubber polymer according to the present invention, suffered from deterioration in low gloss, and the like, and exhibited poorer antiviral properties than the thermoplastic resin composition of Example 2 having the same composition and content as the resin composition of Comparative Example 1 except for the large-diameter rubber polymer; and the thermoplastic resin composition of Comparative Example 2, which was prepared using a rubber-modified vinyl graft copolymer (A5) comprising a diene-based rubber polymer having an average particle diameter of 500 nm instead of the acrylic rubber-modified vinyl graft copolymer according to the present invention, suffered from deterioration in low gloss, weather resistance, and the like, and exhibited poorer antiviral properties than the thermoplastic resin composition of Example 2 having the same composition and content as the resin composition of Comparative Example 1 except for the acrylic rubber-modified vinyl graft copolymer. It could be seen that the resin composition of Comparative Example 3 containing an insufficient amount of the polyether-ester-amide block copolymer suffered from deterioration in antiviral properties, impact resistance, and the like; the resin composition of Comparative Example 4 free from the polyether-ester-amide block copolymer suffered from deterioration in antiviral properties, low gloss, and the like; the resin composition of Comparative Example 5 containing an excess of the polyether-ester-amide block copolymer suffered from deterioration in weather resistance, and the like; and the resin composition of Comparative Example 6 prepared using the polypropylene-polyethylene oxide block copolymer (B2) instead of the polyether-ester-amide block copolymer according to the present invention suffered from deterioration in impact resistance, and the like. In addition, it could be seen that the resin composition of Comparative Example 7 containing an insufficient amount of the silver compound suffered from deterioration in antiviral properties, and the like; the resin composition of Comparative Example 8 containing an excess of the silver compound suffered from deterioration in weather resistance, impact resistance, and the like; the resin composition of Comparative Example 9 containing an insufficient amount of the zinc oxide suffered from deterioration in antiviral properties, and the like; and the resin composition of Comparative Example 10 containing an excess of the zinc oxide suffered from deterioration in low gloss, impact resistance, and the like.

Although the present invention has been described with reference to some example embodiments, it should be understood by those skilled in the art that these embodiments are given by way of illustration only, and that various modifications, variations and alterations can be made without departing from the spirit and scope of the invention. Therefore, the embodiments should not be construed as limiting the technical spirit of the present invention, but should be construed as illustrating the technical spirit of the present invention. The scope of the invention should be interpreted according to the following appended claims as covering all modifications or variations derived from the appended claims and equivalents thereto.

The invention claimed is:
1. A thermoplastic resin composition comprising:
about 100 parts by weight of an rubber-modified aromatic vinyl copolymer resin comprising a diene-based rubber-modified vinyl graft copolymer, an acrylic rubber-modified vinyl graft copolymer, a large-diameter rubber copolymer having an average particle diameter of about 5 to about 10 μm, and an aromatic vinyl copolymer resin;
about 5 to about 25 parts by weight of a polyether-ester-amide block copolymer;

about 0.05 to about 1.5 parts by weight of a silver (Ag) compound; and about 1 to about 15 parts by weight of zinc oxide, the thermoplastic resin composition having a surface gloss of about 40 to about 70%, as measured on a 3.2 mm thick specimen at angle of 60° in accordance with ASTM D523.

2. The thermoplastic resin composition according to claim 1, wherein the rubber-modified aromatic vinyl copolymer resin comprises about 5 to about 15 wt % of the diene-based rubber-modified vinyl graft copolymer, about 5 to about 20 wt % of the acrylic rubber-modified vinyl graft copolymer, about 1 to about 5 wt % of the large-diameter rubber copolymer, and about 55 to about 85 wt % of the aromatic vinyl copolymer resin.

3. The thermoplastic resin composition according to claim 1, wherein the polyether-ester-amide block copolymer is a block copolymer of a reaction mixture comprising an aminocarboxylic acid, lactam, or diamine-dicarboxylic acid salt having 6 or more carbon atoms; a polyalkylene glycol; and dicarboxylic acid having 4 to 20 carbon atoms.

4. The thermoplastic resin composition according to claim 1, wherein the silver compound comprises at least one of metallic silver, silver oxide, silver halide, and a silver ion-containing carrier.

5. The thermoplastic resin composition according to claim 1, wherein a weight ratio of the polyether-ester-amide block copolymer to the sum of the silver compound and the zinc oxide (polyether-ester-amide block copolymer: silver compound+zinc oxide) ranges from about 1:0.1 to about 1:2.

6. The thermoplastic resin composition according to claim 1, wherein a weight ratio of the silver compound to the zinc oxide (silver compound: zinc oxide) ranges from about 1:2 to about 1:100.

7. The thermoplastic resin composition according to claim 1, wherein the thermoplastic resin composition has a virus killing time of about 15 hours or less, as measured on a specimen having a size of 5 cm×5 cm over time at 25° C. and 50% RH in accordance with ISO 21702, in which the specimen is inoculated with porcine epidemic diarrhea virus or influenza A virus fluid.

8. The thermoplastic resin composition according to claim 1, wherein the thermoplastic resin composition has a color variation (ΔE) of about 2.5 or less, as calculated according to Equation 1 based on initial color values ($L_0^*$, $a_0^*$, $b_0^*$) measured on an injection-molded specimen having a size of 50 mm×90 mm×2.5 mm using a colorimeter and color values ($L_1^*$, $a_1^*$, $b_1^*$) of the specimen measured in the same manner as above after testing for 300 hours in accordance with ASTM D4459:

$$\text{Color variation}(\Delta E) = \sqrt{(\Delta L^*)^2 + (\Delta a^*)^2 + (\Delta b^*)^2} \quad \text{[Equation 1]}$$

where $\Delta L^*$ is a difference ($L_1^* - L_0^*$) between L* values before and after testing, $\Delta a^*$ is a difference ($a_1^* - a_0^*$) between a* values before and after testing, and $\Delta b^*$ is a difference ($b_1^* - b_0^*$) between b* values before and after testing.

9. The thermoplastic resin composition according to claim 1, wherein the thermoplastic resin composition has a notched Izod impact strength of about 12 to about 30 kgf·cm/cm, as measured on a ¼" thick specimen in accordance with ASTM D256.

10. A molded article formed from the thermoplastic resin composition according to claim 1.

11. The molded article according to claim 10, wherein the molded article comprises a corrosion surface having a surface roughness of about 1 to about 50 μm on one surface thereof, as measured by a surface roughness meter.

* * * * *